United States Patent [19]

Namba

[11] Patent Number: 5,774,740
[45] Date of Patent: Jun. 30, 1998

[54] CENTRAL PROCESSING UNIT FOR EXECUTION OF ORTHOGONAL AND NON-ORTHOGONAL INSTRUCTIONS

[75] Inventor: Shinji Namba, Kanagawa, Japan

[73] Assignee: Sony Corporation, Japan

[21] Appl. No.: 701,888

[22] Filed: Aug. 23, 1996

Related U.S. Application Data

[63] Continuation of Ser. No. 288,037, Aug. 10, 1994.

[30] Foreign Application Priority Data

Sep. 14, 1993  [JP]  Japan .................................. 5-252563

[51] Int. Cl.[6] ...................................................... G06F 9/26
[52] U.S. Cl. ...................................... 395/800.42; 395/386
[58] Field of Search ................................... 395/800, 386, 395/800.42

[56] References Cited

U.S. PATENT DOCUMENTS

| | | | |
|---|---|---|---|
| 4,807,113 | 2/1989 | Matsumoto et al. | 395/380 |
| 5,117,488 | 5/1992 | Noguchi et al. | 395/375 |
| 5,455,955 | 10/1995 | Kida et al. | 395/800 |

OTHER PUBLICATIONS

Wainwirght et al, "Register Banks Boost 16/32–Bit CPU Performance"; 1987.
Maejima et al; "A 16–Bit Microprocessor with Multi–Register Bank Architecture"; 1988.
Kloker; "The Motorola DSP56000 Digital Signal Processor" IEEE Dec. 1986.

*Primary Examiner*—Larry D. Donaghue
*Attorney, Agent, or Firm*—Ronald P. Kananen

[57] ABSTRACT

In a central processing unit, the processes of two kinds of pipelines, i.e., a pipeline between instructions and pipelines in the instructions, can be executed in accordance with common pipeline control logic, wherein the control logic can be simplified and reduced.

Each part of a machine word determining at least one of each operand and operation is independently configured on a byte basis. The execution of each of instructions other than orthogonal instructions is pipeline-processed. The processes on at least one of each operand and operation in the orthogonal instructions are pipelined. The configurations of the pipelines in the orthogonal instructions and the pipeline between the instructions other than the orthogonal instructions are the same.

14 Claims, 3 Drawing Sheets

ID : DECODE STAGE
CR : CONTROL ROM READ STAGE
EX : CALCULATION EXECUTION STAGE
WB : WRITE STAGE

ID : DECODE STAGE
CR : CONTROL ROM READ STAGE
EX : CALCULATION EXECUTION STAGE
WB : WRITE STAGE

CONFIGURATION DIAGRAM SHOWING AN EMBODIMENT OF THE INVENTION

Fig. 3A

| | ID | CR | EX | WB | | | | |
|---|---|---|---|---|---|---|---|---|
INSTRUCTION 3-1

| | | ID | CR | EX | WB | | | |
INSTRUCTION 3-2

| | | | ID | CR | EX | WB | | |
INSTRUCTION 3-3

3-4 SOURCE PROCESSING
3-5 DESTINATION PROCESSING
3-6 OPERATION PROCESSING

Fig. 3B

INSTRUCTION 4-1

4-3 SOURCE PROCESSING
4-4 DESTINATION PROCESSING
4-5 OPERATION PROCESSING

INSTRUCTION 4-2

4-7 SOURCE PROCESSING
4-8 DESTINATION PROCESSING
4-9 OPERATION PROCESSING

CENTRAL PROCESSING UNIT FOR EXECUTION OF ORTHOGONAL AND NON-ORTHOGONAL INSTRUCTIONS

This application is a continuation of application Ser. No. 08/288,037 filed Aug. 10, 1994.

BACKGROUND OF THE INVENTION

1. Field of the Invention

The present invention relates to central processing units (CPUs) and, more particularly, to a central processing unit which partly includes orthogonal instructions for which at least one operand and various kinds of operations can be independently selected.

2. Description of the Related Art

As a method of increasing the execution speed of the instructions of a computer, the pipeline method is known, wherein one process are divided into several portions and the results of the processes at such portions are sequentially transferred to the next processing portion to complete one process as a whole.

In such a pipeline method, for example, an instruction word is processed by dividing the instruction process into steps such as the fetching, decoding and executing of the instruction and by concurrently performing those steps in parallel. As a result, the processing speed can be effectively increased.

In a central processing unit which partly includes orthogonal instructions for which each of the source, destination and operation steps can be independently selected, the machine word determining the source, destination and operation has conventionally been constituted on a bit basis.

A problem arises in a central processing unit wherein the machine word is constituted on a bit basis and the source, destination and operation codes do not use one independent byte (or a plurality of independent bytes). Here when it is attempted to increase the speed at which the instructions are processed by pipelining the processes on the instructions (pipelining between instructions) and by pipelining the processes on the source, destination and operation in the instructions (pipelining in instructions), it has been necessary to configure control logic to process each of these two pipelines as completely separate pipelines because the stages of these two pipelines are not symmetrical.

This has resulted in a problem in that control logic must be separately provided for the two kinds of pipelines, i.e., the pipeline between the instructions and the pipelines in the instructions. The parallel processing of the two kinds of pipelines is difficult because of the asymmetry between them.

OBJECT AND SUMMARY OF THE INVENTION

The present invention confronts the above-described problem, and it is an object of the present invention to provide a central processing unit wherein the processes of two kinds of pipelines, i.e., a pipeline between the instructions and pipelines in the instructions, can be executed in accordance with common pipeline control logic and wherein the control logic can be simplified and reduced.

According to the present invention, there is provided a central processing unit which partly includes orthogonal instructions for which at least one operand and various kinds of operations can be independently selected and in which each of parts of a machine word determining at least one each operand and operation is independently configured on a byte basis; the execution of the each of instructions other than the orthogonal instructions is pipeline-processed; the processes on at least one each operand and operation in the orthogonal instructions are pipelined; and the configurations of the pipelines in the orthogonal instructions and the pipeline between the instructions other than the orthogonal instructions are the same.

In a central processing unit having the configuration as described above, each of the parts of the machine word determining at least one of each operand and operation is independently configured on a byte basis, and the processes on at least one of each operand and operation are pipelined so the stages in the two kinds of pipelines, i.e., the pipeline between the instructions and the pipelines in the instructions can be symmetrical with each other.

This makes it possible to execute the processes in the two kinds of pipelines in accordance with common pipeline control logic and consequently to simplify and reduce the control logic.

BRIEF DESCRIPTION OF THE DRAWINGS

FIG. 3A illustrates a configuration of a pipeline showing a first example of the execution of an instruction string including one orthogonal instruction.

FIG. 3B illustrates a configuration of a pipeline showing a second example of the execution of an instruction string including two consecutive orthogonal instructions.

DETAILED DESCRIPTION OF THE PREFERRED EMBODIMENT

A preferred embodiment of the present invention will now be described in detail with reference to the accompanying drawings.

First, an example of a configuration of a central processing unit (CPU) will be described with reference to the block diagram in FIG. 1.

Figure 1:
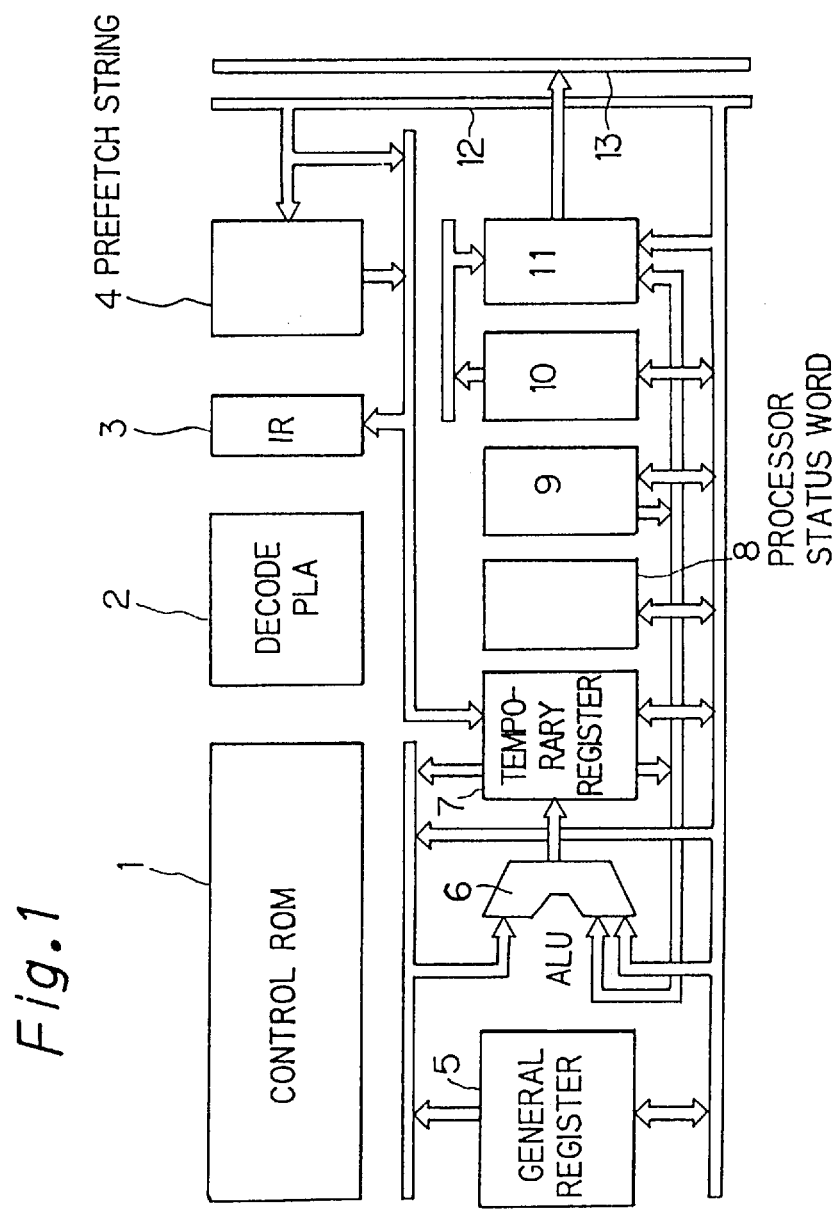
FIG. 1 is a block diagram showing an example of a configuration of a central processing unit.

As shown in FIG. 1, the central processing unit is comprised of a control ROM 1, a decode PLA 2, an information retrieving (IR) portion 3, a prefetch string 4. a general register 5, an ALU (arithmetic logic unit) 6, a temporary register 7, a processor status word 8, a program counter 9, a page register 10 and an address buffer 11. Those blocks are interconnected through a data bus 12, and addresses from the address buffer are output to the address bus 13.

The central processing unit according to the present invention partly includes orthogonal instructions for which each of the source, destination and operation can be independently selected.

Figure 2A:
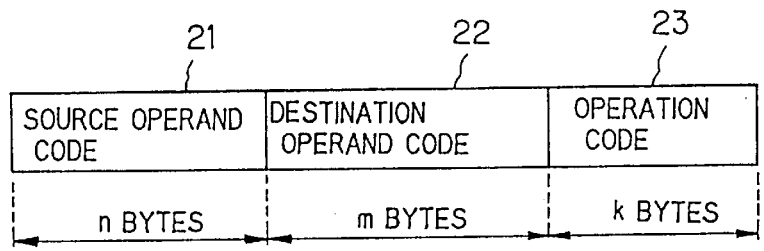
FIG. 2A illustrates a configuration of a machine word according to a first embodiment of the present invention.

According to the present invention, a machine word is divided into independent parts for selecting and determining the source, destination and operation which are constituted by independent units of bytes as shown in FIG. 2A.

In the present embodiment, a part 21 of the machine word which determines the source is constituted by n bytes; a part 22 of the machine word which determines the destination is constituted by m bytes; and a part 23 of the machine word which determines the operation is constituted by k bytes. The numbers n, m and k are whole numbers.

Although the lengths of the three parts 21, 22 and 23 of the machine word which respectively determine the source, destination and operation are fixed in the present embodiment, the lengths may be variable. For example, the machine word may have a configuration such that the part 21 determining the source can contain n+1 bytes rather than n bytes and the part 22 determining the destination can contain m−1 bytes rather than m bytes.

What is essential is that each of the parts of the machine word determining the source, destination and operation is constituted by one or a plurality of bytes which are independent of each other, and the length of each part may be either fixed or variable.

Figure 2B:
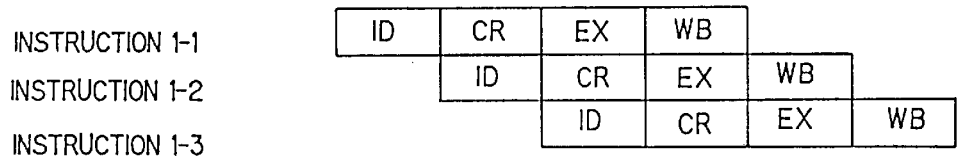
FIG. 2B illustrates a configuration of a pipeline between instructions according to the first embodiment of the present invention.
Figure 2C:
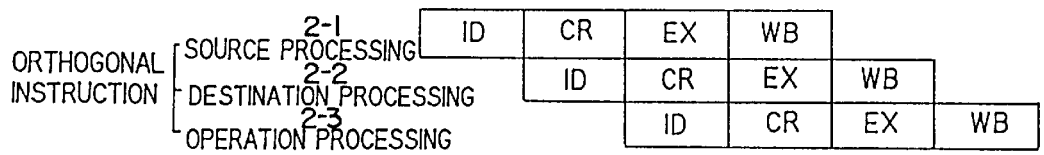
FIG. 2C illustrates a configuration of a pipeline in an instruction according to the first embodiment of the present invention.

When the execution of instructions other than orthogonal instructions is pipelined as shown in FIG. 2B in a central processing unit according to the present embodiment having the above-described configuration, the execution of the orthogonal instructions is also pipelined as shown in FIG. 2C. At this time, the configurations of the process for pipelining instructions used in FIG. 2B and the pipelining process in an instruction used in FIG. 2C are made identical to each other.

In the present embodiment, as shown in FIG. 2B, the pipeline for each of the instructions other than the orthogonal instructions is constituted by four stages, i.e., an ID (decode) stage, a CR (control ROM read) stage, an EX (calculation execution) stage and a WB (write) stage.

As shown in FIG. 2C, for the orthogonal instructions, the processes in the instructions are pipelined. Like the pipelines for instructions, such a pipeline is also constituted by four stages, i.e., an ID (decode) stage, a CR (control ROM read) stage, an EX (calculation execution) stage and a WB (write) stage.

Although pipelines consisting of four stages, i.e., the ID, CR, EX and WB stages are proposed in the present embodiment, the pipelines may have any configuration with regard to the number of the stages of the pipelines and assignment of processes to the stages.

However, the configuration of the pipeline for each instruction and the configuration of the pipelines for the source, destination and operation in an instruction must be the same, i.e., the process performed at the ID stage shown in FIG. 2B must be symmetrical with the process performed at the ID stage shown in FIG. 2C. In other words, the types of the processes which can be performed at the two ID stages such as data transfer and setting of a status register must be the same and the selection and activation of such processes must be controlled by a single control logic circuit. It is essential to the present invention that similar symmetry exists for the CR, EX and WB stages.

The above-described configuration of the machine word is necessary for the pipeline processes in orthogonal instructions to make it possible to decode the parts of the machine word for selecting and determining the source, destination and operation independently for the respective ID stages and to sequentially send out the processes to the pipeline processes in the instructions.

Specifically, in FIG. 2C, the part 21 of the machine word in FIG. 2A is decoded at the ID stage of the source processing of an instruction 2-1; the part 22 of the machine word in FIG. 2A is decoded at the ID stage of the destination processing of an instruction 2-2; and the part 23 of the machine word in FIG. 2A is decoded at the ID stage of the operation processing of an instruction 2-3. Thus, the three processes of the orthogonal instructions are executed in parallel by sequentially sending them to the pipelines as if they were independent instructions.

As previously described, such processing can not be carried out unless each of the parts of each machine word determining the source, destination and operation are independently configured on a byte basis.

According to the present invention wherein such pipelining is realized, since the pipeline for instructions and the pipelines in the instructions are combined, the execution of the instructions can be carried out as shown in FIG. 3A.

In FIG. 3A, instructions 3-1 and 3-3 are instructions which are not included in a group of orthogonal instructions and an instruction 3-2 is an instruction included in the group of orthogonal instructions. As shown in FIG. 3A, source processing 3-4, destination processing 3-5 and operation processing 3-6 of an orthogonal instruction between the instructions 3-1 and 3-3 can be pipeline-processed in parallel with the preceding and succeeding instructions.

As described above, the pipeline for each of instructions other than orthogonal instructions and the pipeline for the source, destination and operation processes in an orthogonal instruction have the same configuration. As a result, there is an analogy between the parallelism between the instructions as shown in FIG. 2B and the parallelism between the processes in an instruction as shown in FIG. 2C, as seen in steps 2-1, 2-2, and 2-3, which allows parallel execution of an instruction string, having instructions 3-1, 3-2, and 3-3, to be carried out as shown in FIG. 3A, as seen in steps 3-4, 3-5, and 3-6.

The execution of two consecutive orthogonal instructions is as shown in FIG. 3B. It is possible also in this case to execute the source, destination and operation processes in each of orthogonal instructions 4-1 and 4-2 in parallel and to process those instructions in parallel, as seen in steps 4-3 through in FIG. 3B.

According to such a pipeline processing method, it is possible to control the pipelined-execution in instructions and the pipelined execution between instructions with a single control logic circuit. Therefore, the scale of the control logic circuit can be reduced compared to a central processing unit wherein the pipeline between the instructions and the pipelines in the instructions are separately configured.

In addition, the parallel processing of the source, destination and operation of the group of orthogonal instructions increases the processing speed. Since the pipelines used are completely the same as those used for the pipelining between the instructions, there is no need for designing a new pipeline for the parallel processing in instructions, and the designing time is reduced.

Although instructions having two operands, i.e., source and destination operands have been described in the present embodiment, the present invention is not limited to such a two-operand instruction, but can be applied also to one-operand instructions or instructions having three or more operands.

As described above, according to the present invention, each of parts of the each machine word determining at least one each operand and operation is independently configured on a byte basis; the execution of each of instructions other than the orthogonal instructions is pipeline-processed; the processes on at least one each operand and operation in the orthogonal instructions are pipelined; and the configurations of the pipelines for executing the orthogonal instructions are the same as the configurations of the pipelines for executing the instructions other than the orthogonal instructions. This makes it possible to make the stages in the two kinds of pipelines, i.e., the pipelines for execution of the orthogonal instructions as well as the pipeline for execution of the non-orthogonal instructions between the orthogonal instructions are symmetrical with each other. As a result, the processes in the two kinds of pipelines can be executed in accordance with common pipeline control logic and, consequently, the control logic can be simplified and reduced.

Various details of the invention may be changed without departing from its spirit nor its scope. Furthermore, the foregoing description of the embodiment according to the present invention is provided for the purpose of illustration only, and not for the purpose of limiting the invention as defined by the appended claims and their equivalents.

What is claimed is:

1. A central processing unit for processing both orthogonal and non-orthogonal instructions, wherein:

said orthogonal instructions each designate at least one operand and an operation;

each orthogonal instruction comprises a plurality of segments, where each segment designates an operand or an operation and is independently configured;

said central processor processes non-orthogonal instructions by pipeline-processing;

said central processor processes orthogonal instructions by pipeline-processing; and a pipeline for processing orthogonal instructions and a pipeline for processing non-orthogonal instructions have the same configuration, each pipeline configuration comprising a decode stage, a control ROM stage, a calculation execution stage and a write stage.

2. The central processing unit according to claim 1, wherein each said orthogonal instruction designates said at least one operand by a source or a destination.

3. The central processing unit according to claim 1, wherein each of said instructions is a machine word.

4. The central processing unit according to claim 3, wherein each part of said machine word is independently configured on a byte basis.

5. The central processing unit according to claim 1, wherein said pipeline for processing orthogonal instructions and said pipeline for processing non-orthogonal instructions are controlled in accordance with a common pipeline control logic.

6. The central processing unit according to claim 3, wherein said machine word is independently decoded at each decode stage.

7. The central processing unit according to claim 2, wherein each orthogonal instruction designates an operand by both source and destination.

8. The central processing unit according to claim 1, wherein said decode stage comprises a decode PLA connected to a data bus.

9. The central processing unit according to claim 1, wherein said central processing unit comprises a word status processor, a program counter and a page register connected to a data bus.

10. The central processing unit according to claim 7, wherein each orthogonal instruction sequentially designates an operand source, an operand destination, and an operation.

11. The central processing unit according to claim 1, wherein the decode stage of the pipeline for non-orthogonal instructions and the decode stage of the pipeline for orthogonal instructions perform the same range of functions.

12. The central processing unit according to claim 1, wherein the control ROM stage of the pipeline for non-orthogonal instructions and the control ROM stage of the pipeline for orthogonal instructions perform the same range of functions.

13. The central processing unit according to claim 1, wherein the calculation execution stage of the pipeline for non-orthogonal instructions and the calculation execution stage of the pipeline for orthogonal instructions perform the same range of functions.

14. The central processing unit according to claim 1, wherein the write stage of the pipeline for non-orthogonal instructions and the write stage of the pipeline for orthogonal instructions perform the same range of functions.

* * * * *